(12) United States Patent
Wang et al.

(10) Patent No.: US 10,959,188 B2
(45) Date of Patent: Mar. 23, 2021

(54) TECHNIQUES AND APPARATUSES FOR POWER CONTROL FOR UPLINK CHANNELS

(71) Applicant: QUALCOMM Incorporated, San Diego, CA (US)

(72) Inventors: Renqiu Wang, San Diego, CA (US); Hao Xu, Beijing (CN); Wanshi Chen, San Diego, CA (US); Peter Gaal, San Diego, CA (US); Wei Zeng, Cupertino, CA (US); Tingfang Ji, San Diego, CA (US); Amir Aminzadeh Gohari, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 417 days.

(21) Appl. No.: 15/851,868

(22) Filed: Dec. 22, 2017

(65) Prior Publication Data

US 2018/0206196 A1    Jul. 19, 2018

Related U.S. Application Data

(60) Provisional application No. 62/446,712, filed on Jan. 16, 2017.

(51) Int. Cl.
*H04W 52/32*    (2009.01)
*H04W 72/04*    (2009.01)
(Continued)

(52) U.S. Cl.
CPC ....... *H04W 52/325* (2013.01); *H04W 52/146* (2013.01); *H04W 52/16* (2013.01);
(Continued)

(58) Field of Classification Search
CPC .......... H04W 72/0446; H04W 52/343; H04W 52/325; H04W 52/225; H04W 72/0413;
(Continued)

(56) References Cited

U.S. PATENT DOCUMENTS

2010/0034315 A1    2/2010  Khandekar et al.
2011/0250899 A1*  10/2011  Vajapeyam ........... H04W 52/40
                                                        455/450
(Continued)

FOREIGN PATENT DOCUMENTS

EP    2557708 A1    2/2013

OTHER PUBLICATIONS

International Search Report and Written Opinion—PCT/US2017/068454—ISA/EPO—dated Apr. 5, 2018.

*Primary Examiner* — Oussama Roudani
(74) *Attorney, Agent, or Firm* — Harrity & Harrity, LLP/Qualcomm

(57) ABSTRACT

A user equipment (UE) may transmit a control channel and a data channel using contiguous resource allocations of a portion of a slot. The control channel may be associated with control channel power spectral density (PSD) and the data channel may be associated with a data channel PSD. When a difference between the control channel PSD and the data channel PSD exceeds a maximum delta value, the UE may experience degraded performance as a result of tonal interference and/or the like. In some aspects, the UE may determine a control channel transmit power for the control channel and a data channel transmit power for the data channel. The control channel transmit power and the data channel transmit power may be determined such that the maximum delta value is not exceeded and that a threshold relating to a link budget is satisfied, thereby ensuring that performance is not degraded.

30 Claims, 7 Drawing Sheets

(51) Int. Cl.
    *H04W 52/14*     (2009.01)
    *H04W 52/16*     (2009.01)
    *H04W 52/22*     (2009.01)
    *H04W 52/34*     (2009.01)
    *H04W 72/14*     (2009.01)

(52) U.S. Cl.
    CPC ....... *H04W 52/225* (2013.01); *H04W 52/343* (2013.01); *H04W 52/346* (2013.01); *H04W 72/0413* (2013.01); *H04W 72/0446* (2013.01); *H04W 72/0473* (2013.01); *H04W 72/14* (2013.01)

(58) Field of Classification Search
    CPC . H04W 52/346; H04W 52/146; H04W 52/16; H04W 72/14; H04W 72/0473
    See application file for complete search history.

(56) References Cited

U.S. PATENT DOCUMENTS

| | | |
|---|---|---|
| 2012/0327866 A1 | 12/2012 | Krishnamurthy et al. |
| 2013/0028214 A1* | 1/2013 | Imamura ................. H04L 5/001 370/329 |
| 2013/0044621 A1* | 2/2013 | Jung ................... H04W 72/082 370/252 |
| 2014/0241290 A1* | 8/2014 | Zhang ............... H04W 72/1247 370/329 |
| 2017/0273056 A1* | 9/2017 | Papasakellariou .. H04W 52/281 |

* cited by examiner

TECHNIQUES AND APPARATUSES FOR POWER CONTROL FOR UPLINK CHANNELS

CROSS-REFERENCE TO RELATED APPLICATIONS UNDER 35 U.S.C. § 119

This application claims priority to U.S. Provisional Patent Application 62/446,712 filed on Jan. 16, 2017 entitled "TECHNIQUES AND APPARATUSES FOR POWER CONTROL FOR UPLINK CHANNELS," which is incorporated by reference herein.

BACKGROUND

Field

Aspects of the present disclosure generally relate to wireless communication, and more particularly to techniques and apparatuses for power control for uplink channels.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different wireless communication devices to communicate on a municipal, national, regional, and even global level. New radio (NR), which may also be referred to as 5G, is a set of enhancements to the LTE mobile standard promulgated by the Third Generation Partnership Project (3GPP). 5G is designed to better support mobile broadband Internet access by improving spectral efficiency, lowering costs, improving services, making use of new spectrum, and better integrating with other open standards using OFDM with a cyclic prefix (CP) (CP-OFDM) on the downlink (DL), using CP-OFDM and/or SC-FDM (e.g., also known as discrete Fourier transform spread ODFM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and 5G technologies. Preferably, these improvements should be applicable to other multiple access technologies and the telecommunication standards that employ these technologies.

A user equipment (UE) may perform uplink control of uplink transmissions by transmitting a set of uplink messages. To perform uplink control, the UE may transmit a message associated with a control channel, such as a physical uplink control channel (PUCCH), or a data channel, such as a physical uplink shared channel (PUSCH). The control channel and the data channel may be associated with different sets of parameters. For example, the control channel may be associated with a relatively low quadrature phase shift keying (QPSK) data rate, may be able to operate at a relatively low signal to noise ratio (SNR), and/or the like. Similarly, the data channel may be associated with a relatively high quadrature amplitude modulation (QAM) data rate, may be able to operate at a relatively high SNR, and/or the like. The UE may transmit messages via the control channel or data channel to convey a scheduling request (SR), an acknowledgement (ACK), a channel quality indicator (CQI), and/or the like. The control channel and the data channel may be associated with different transmit powers for transmission of messages as a result of the different sets of parameters. Conventionally, a UE will not send a control channel (e.g., a PUCCH) and a data channel (e.g., a PUSCH) in the same subframe or slot.

SUMMARY

The present invention provides a mechanism by which a BS may schedule messages for transmission via the control channel and the data channel in contiguous resource blocks of the same slot. The UE may be unable to switch from a first transmit power in the control channel to a second transmit power in the data channel when a first power spectral density (PSD) associated with the first transmit power differs from a second PSD associated with the second transmit power by greater than a threshold amount. For example, a difference between a control channel PSD and a data channel PSD power may be greater than 20 decibels (dB), which may cause tone interference between the control channel and the data channel or may cause other negative effects to performance. Thus, it may be beneficial to determine transmit powers for the control channel and the data channel that result in respective PSDs that differ by less than the threshold amount. Additionally, the UE may be associated with a link budget and may be unable to transmit at greater than a particular transmit power as a result of the link budget. Exceeding the link budget may negatively affect network performance. Thus, it may be beneficial to determine transmit powers for the control channel and the data channel that do not result in the UE exhausting the link budget.

Aspects described herein may enable determination of transmit powers for a data channel and for a control channel when messages for the data channel and for the control channel are to be transmitted using contiguous resource blocks of a portion of a slot. A control channel transmit power for the control channel and a data channel transmit power for the data channel may be determined to ensure that a control channel PSD for the control channel is within a threshold amount of a data channel PSD for the data channel. This may ensure that the UE can switch from transmitting the control channel to transmitting the data channel or switch from transmitting the data channel to transmitting the control channel without degraded performance. Similarly, the control channel transmit power and the data channel transmit power may be determined to ensure that the UE does not exceed a threshold relating to a link budget, thereby avoiding causing a negative effect to network performance.

In an aspect of the disclosure, a method, a user equipment, an apparatus, and a computer program product are provided.

In some aspects, the method may include determining, by a UE, a control channel transmit power for a control channel and a data channel transmit power for a data channel that are to be transmitted during a portion of a slot. A difference between a control channel PSD associated with the control channel transmit power and a data channel PSD associated with the data channel transmit power may be less than a threshold. The control channel transmit power and the data channel transmit power may satisfy a threshold relating to a link budget. The method may include transmitting, by the UE, at least one of the control channel or the data channel during the portion of the slot.

In some aspects, the user equipment may include a memory and one or more processors coupled to the memory. The memory and the one or more processors may be configured to determine a control channel transmit power for a control channel and a data channel transmit power for a data channel that are to be transmitted during a portion of a slot. A difference between a control channel PSD associated with the control channel transmit power and a data channel PSD associated with the data channel transmit power may be less than a threshold. The control channel transmit power and the data channel transmit power may satisfy a threshold relating to a link budget. The memory and the one or more processors may be configured to transmit at least one of the control channel or the data channel during the portion of the slot.

In some aspects, the apparatus may include means for determining a control channel transmit power for a control channel and a data channel transmit power for a data channel that are to be transmitted during a portion of a slot. A difference between a control channel PSD associated with the control channel transmit power and a data channel PSD associated with the data channel transmit power may be less than a threshold. The control channel transmit power and the data channel transmit power may satisfy a threshold relating to a link budget. The apparatus may include means for transmitting at least one of the control channel or the data channel during the portion of the slot.

In some aspects, the computer program product may include a non-transitory computer-readable medium storing one or more instructions for wireless communication that, when executed by one or more processors of a user equipment, cause the one or more processors to determine a control channel transmit power for a control channel and a data channel transmit power for a data channel that are to be transmitted during a portion of a slot. A difference between a control channel PSD associated with the control channel transmit power and a data channel PSD associated with the data channel transmit power may be less than a threshold. The control channel transmit power and the data channel transmit power may satisfy a threshold relating to a link budget. The one or more instructions may cause the one or more processors to transmit at least one of the control channel or the data channel during the portion of the slot.

Aspects generally include a method, apparatus, system, computer program product, non-transitory computer-readable medium, user equipment, wireless communication device, and processing system as substantially described herein with reference to and as illustrated by the accompanying drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

DETAILED DESCRIPTION

Figure 1:
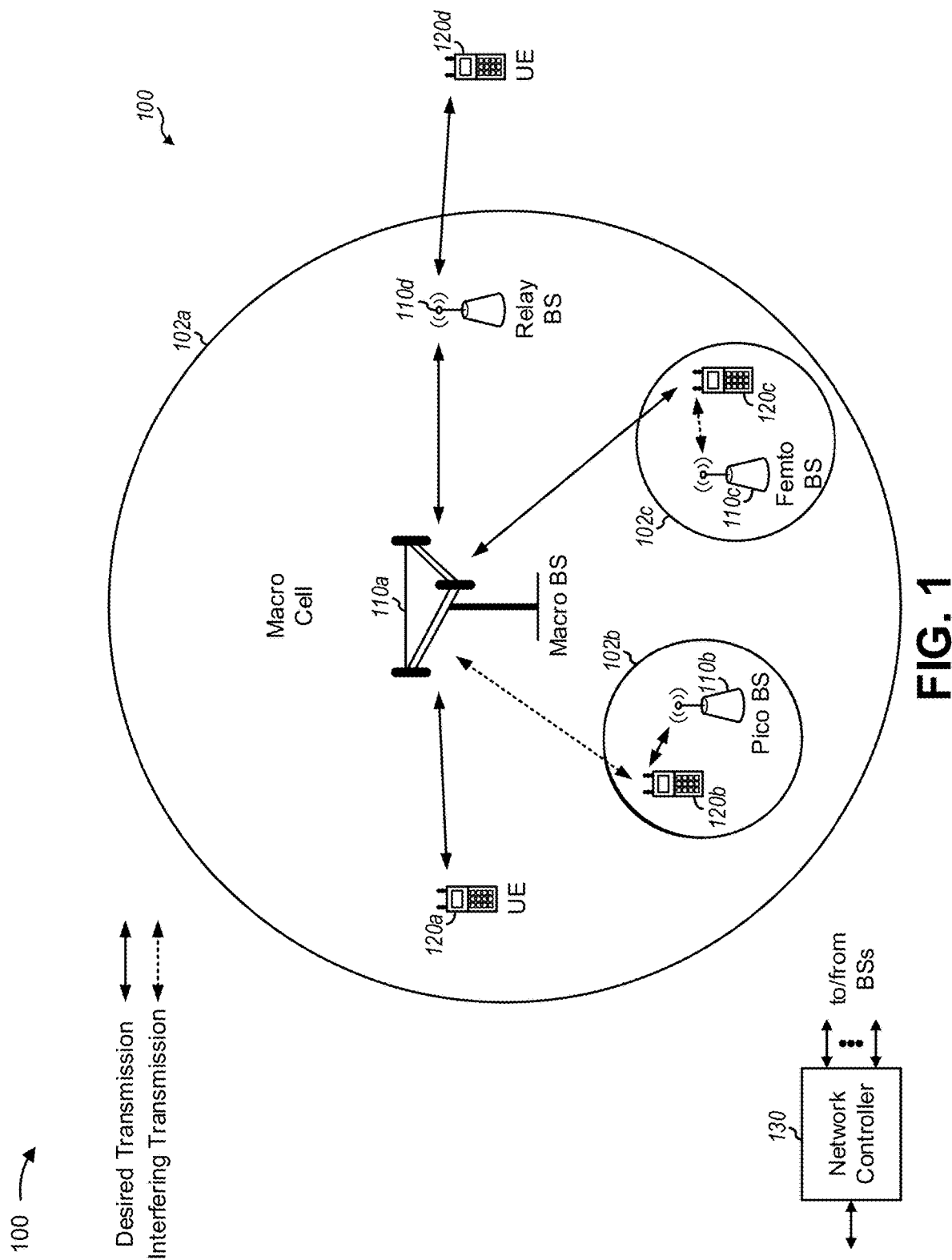
FIG. 1 is diagram) illustrating an example of a wireless communication network.

The detailed description set forth below in connection with the appended drawings is intended as a description of various configurations and is not intended to represent the configurations in which the concepts described herein may be practiced. The detailed description includes specific details for the purposes of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, and/or the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, and/or the like, whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

An access point (AP) may comprise, be implemented as, or known as a NodeB, a Radio Network Controller (RNC), an eNodeB (eNB), a Base Station Controller (BSC), a Base Transceiver Station (BTS), a Base Station (BS), a Transceiver Function (TF), a Radio Router, a Radio Transceiver, a Basic Service Set (BSS), an Extended Service Set (ESS), a Radio Base Station (RBS), a Node B (NB), a gNB, a 5G NB, a 5G BS, a Transmit Receive Point (TRP), or some other terminology.

An access terminal (AT) may comprise, be implemented as, or be known as an access terminal, a subscriber station, a subscriber unit, a mobile station, a remote station, a remote terminal, a user terminal, a user agent, a user device, user equipment (UE), a user station, a wireless node, or some other terminology. In some aspects, an access terminal may comprise a cellular telephone, a smart phone, a cordless telephone, a Session Initiation Protocol (SIP) phone, a wireless local loop (WLL) station, a personal digital assistant (PDA), a tablet, a netbook, a smartbook, an ultrabook, a handheld device having wireless connection capability, a Station (STA), or some other suitable processing device connected to a wireless modem. Accordingly, one or more aspects taught herein may be incorporated into a phone (e.g., a cellular phone, a smart phone), a computer (e.g., a desktop), a portable communication device, a portable computing device (e.g., a laptop, a personal data assistant, a tablet, a netbook, a smartbook, an ultrabook), wearable device (e.g., smart watch, smart glasses, smart bracelet, smart wristband, smart ring, smart clothing, and/or the like), medical devices or equipment, biometric sensors/devices, an entertainment device (e.g., music device, video device, satellite radio, gaming device, and/or the like), a vehicular component or sensor, smart meters/sensors, industrial manufacturing equipment, a global positioning system device, or any other suitable device that is configured to communicate via a wireless or wired medium. In some aspects, the node is a wireless node. A wireless node may provide, for example, connectivity for or to a network (e.g., a wide area network such as the Internet or a cellular network) via a wired or wireless communication link. Some UEs may be considered machine-type communication (MTC) UEs, which may include remote devices that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example. Examples of MTC devices include sensors, meters, location tags, monitors, drones, robots/robotic devices, and/or the like. MTC UEs, as well as other types of UEs, may be implemented as NB-IoT (narrowband internet of things) devices.

It is noted that while aspects may be described herein using terminology commonly associated with 3G and/or 4G wireless technologies, aspects of the present disclosure can be applied in other generation-based communication systems, such as 5G and later, including 5G technologies.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110*a*, BS 110*b*, BS 110*c*, and BS 110*d*) and other network entities. A BS is an entity that communicates with user equipment (UEs) and may also be referred to as a base station, a 5G BS, a Node B, a gNB, a 5G NB, an access point, a TRP, and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "5G BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul. In some aspects, network controller 130 may communicate with the BSs to determine a schedule for control channel and/or data channel transmissions. For example, network controller 130 may determine that a control channel and a data channel are to be scheduled for a data channel region of a slot. Additionally, or alternatively, network controller 130 may determine that the control channel and the data channel are to be scheduled for a control channel region of the slot. In some aspects, network controller 130 may determine that the control channel and the data channel are to be scheduled for contiguous resource blocks of a portion of a slot. For example, network controller 130 may allocate a first set of resource blocks of the data channel region of the slot for transmitting the control channel, a second set of resource blocks of the data channel region of the slot for transmitting the data channel, and a third set of resource blocks of the data channel region of the slot for transmitting the control channel. In this case, the first set of resource blocks, the second set of resource blocks, and the third set of resource blocks may be sequential sets of resource blocks in the slot.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium. Some UEs may be considered evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices. Some UEs may be considered a Customer Premises Equipment (CPE).

In FIG. 1, a solid line with double arrows indicates candidate transmissions between a UE and a serving BS, which is a BS designated to serve the UE on the downlink and/or uplink. A dashed line with double arrows indicates potentially interfering transmissions between a UE and a BS.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some examples, access to the air interface may be scheduled, wherein a scheduling entity (e.g., a base station, a network controller, a user equipment, etc.) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. For example, the scheduling entity may schedule an allocation of resource blocks for a control channel, a data channel, and/or the like. In some aspects, such scheduling information may be communicated via signaling from the scheduling entity. For example, a UE may receive semi-static signaling, such as a system information block (SIB) message, identifying a resource allocation adjustment, a threshold maximum difference between PSDs for a control channel and a data channel, and/or the like. Additionally, or alternatively, signaling may be performed using dynamic signaling, such as via the control channel.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As indicated above, FIG. 1 is provided merely as an example. Other examples are possible and may differ from what was described with regard to FIG. 1.

Figure 2:
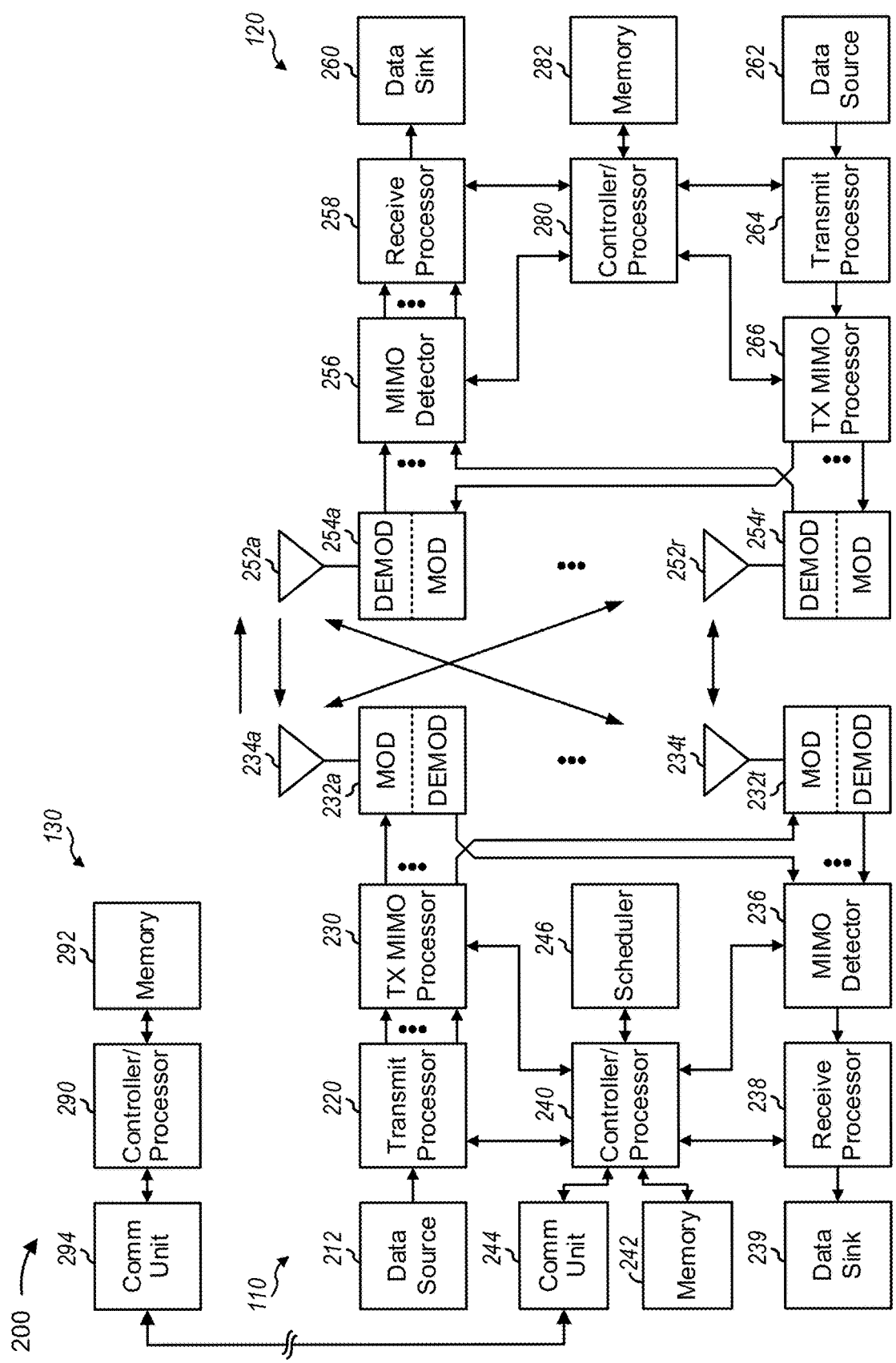
FIG. 2 is a diagram illustrating an example of a base station in communication with a user equipment (UE) in a wireless communication network.

FIG. 2 shows a block diagram 200 of a design of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. The CQIs may be received via, for example, a control channel based at least in part on a UE determining a transmit power for the control channel. Transmit processor 220 may also process system information (e.g., for semi-static resource partitioning information (SRPI), and/or the like) and control information (e.g., CQI requests, grants, upper layer signaling, and/or the like) and provide overhead symbols and control symbols. Transmit processor 220 may also generate reference symbols for reference signals (e.g., the CRS) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to certain aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine RSRP, RSSI, RSRQ, CQI, and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controllers/processors 240 and 280 and/or any other component(s) in FIG. 2 may direct the operation at base station 110 and UE 120, respectively, to transmit a control channel and a data channel in contiguous resource blocks of a portion of a slot. For example, controller/processor 280 and/or other processors and modules at UE 120 may determine a control channel transmit power for a control channel and a data channel transmit power for a data channel. In some aspects, controller/processor 240 of base station 110 may perform or direct controller/processor 280 and/or other processors and modules at UE 120 to determine a resource allocation for the control channel or a resource allocation for the data channel to control the transmit power for the control channel or the transmit power for the data channel, respectively. In some aspects, one or more of the components shown in FIG. 2 may be employed to perform example process 500 of FIG. 5 and/or other processes for the techniques described herein. Memories 242 and 282 may store data and program codes for BS 110 and UE 120, respectively. A scheduler 246 may schedule UEs for data transmission on the downlink and/or uplink. For example, scheduler 246 may schedule a UE 120 to transmit a control channel and a data channel in contiguous resource blocks of a portion of a slot, and may cause BS 110 to transmit signaling indicating the schedule for transmitting the control channel and the data channel, a resource allocation for the control channel and the data channel, and/or the like.

As indicated above, FIG. 2 is provided merely as an example. Other examples are possible and may differ from what was described with regard to FIG. 2.

Figure 3:
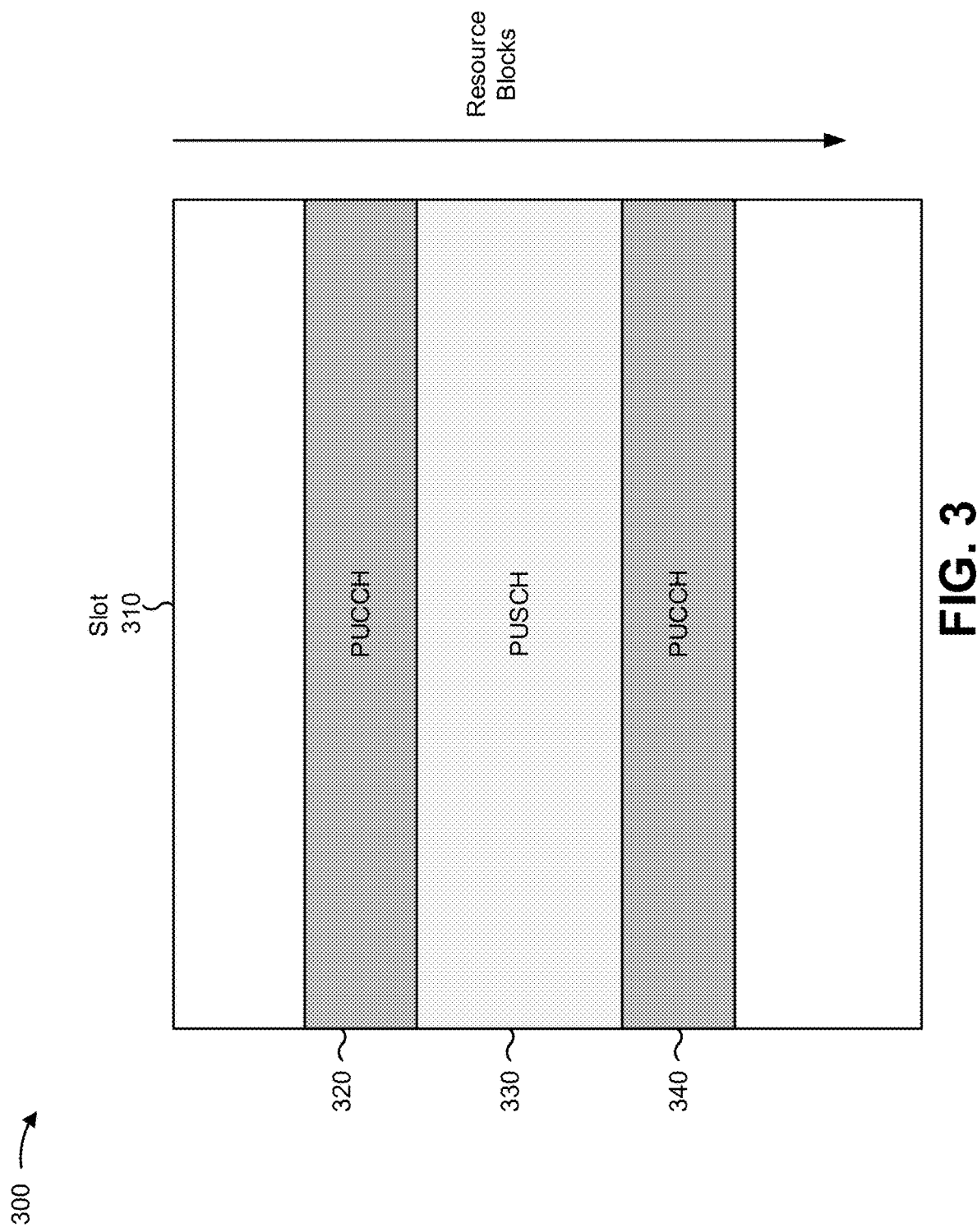
FIG. 3 is a diagram illustrating an example of a control channel and a data channel scheduled for contiguous resource blocks of a portion of a slot.

FIG. 3 is a diagram illustrating an example 300 of control channel and a data channel scheduled for contiguous resource blocks of a portion of a slot.

As shown in FIG. 3, a portion of slot 310 includes a physical uplink control channel (PUCCH) 320, a physical uplink shared channel (PUSCH) 330, and a PUCCH 340 in contiguous resource blocks. In some aspects, slot 310 may include a PUSCH region of slot 310, a PUCCH region of slot 310, and/or the like. Slot 310 may include a DL-centric subframe, a UL-centric subframe, and/or the like. A first set of resource blocks of slot 310 may be assigned for PUCCH 320, a second set of resource blocks of slot 310 may be assigned for PUSCH 330, and a third set of resource blocks of slot 310 may be assigned for PUCCH 340. For example, PUCCH 320 may be assigned a first two resource blocks of slot 310 and PUSCH 330 may be assigned a next one resource block of slot 310 after the first two resource blocks assigned to PUCCH 320. Similarly, PUCCH 340 may be assigned a next two resource blocks of slot 310 after the one resource block of slot 310 assigned to PUSCH 330. The quantity of resource blocks assigned to PUCCH 320, PUSCH 330, and PUCCH 340, identified above, are simply examples.

In some aspects, a UE, such as the UE 120, may determine a quantity of resource blocks that are to be used for PUCCH 320, PUSCH 330, or PUCCH 340 based at least in part on determining a transmit power. For example, the UE may determine that a transmit power of PUSCH 330 is to be reduced from a candidate transmit power based at least in part on determining that a PSD for PUSCH 330 is increased relative to a candidate PSD. In this case, the UE may reduce the quantity of resource blocks from, for example, one resource block to, for example, one half of a resource block. In this way, the UE may reduce per channel transmit power to a lower transmit power.

Slot 310 that includes, for example, an UL short burst portion. The UL short burst portion may sometimes be referred to as an UL burst, an UL burst portion, a common UL burst, a short burst, an UL short burst, a common UL short burst, a common UL short burst portion, and/or various other suitable terms. In some aspects, the UL short burst portion may include one or more reference signals. Additionally, or alternatively, the UL short burst portion may include feedback information corresponding to various other portions of slot 310. For example, the UL short burst portion may include feedback information corresponding to a control portion of slot 310 and/or a data portion of slot 310. Non-limiting examples of information that may be included in the UL short burst portion include an ACK signal (e.g., a PUCCH ACK, a PUSCH ACK), a NACK signal (e.g., a PUCCH NACK, a PUSCH NACK), a scheduling request (SR), a buffer status report (BSR), a HARQ indicator, a channel state indication (CSI), a channel quality indicator (CQI), a sounding reference signal (SRS), a demodulation reference signal (DMRS), PUSCH data, and/or various other suitable types of information. The UL short burst portion may include additional or alternative information, such as information pertaining to random access channel (RACH) procedures, scheduling requests, and various other suitable types of information.

In some aspects, a UE may determine a transmit power based at least in part on a type of information that is to be included in slot 310 (e.g., in PUCCH 320, PUSCH 330, and/or PUCCH 340). For example, when PUCCH 320 is to convey an SR or an ACK signal and the UE is in a power limited scenario (e.g., the UE cannot accommodate a candidate transmit power as a result of a link budget threshold), the UE may determine that PUCCH 320 or PUCCH 340 is to be assigned a transmit power corresponding to a PSD that is a maximum delta value higher than a PSD corresponding to a transmit power for PUSCH 330. A delta value may represent a difference between a control channel PSD corresponding to the control channel transmit power and a data channel PSD corresponding to a data channel transmit power. The maximum delta value may represent a maximum difference in PSDs that the UE can accommodate for contiguous resource blocks. In some aspects, when a CQI is to be transmitted, the UE may determine that PUSCH 330 is to be assigned a transmit power corresponding to a PSD that is the maximum delta value higher than a PSD corresponding to the transmit power for PUCCH 320 and/or PUCCH 340.

Although described herein in terms of a PUSCH 330 scheduled for resource blocks located between a PUCCH 320 and a PUCCH 340, another schedule of resource blocks may be possible, such as different quantities of PUCCHs or PUSCHs, different orderings of PUCCHs or PUSCHs, and/or the like.

As indicated above, FIG. 3 is provided as an example. Other examples are possible and may differ from what was described with respect to FIG. 3.

Figure 4:
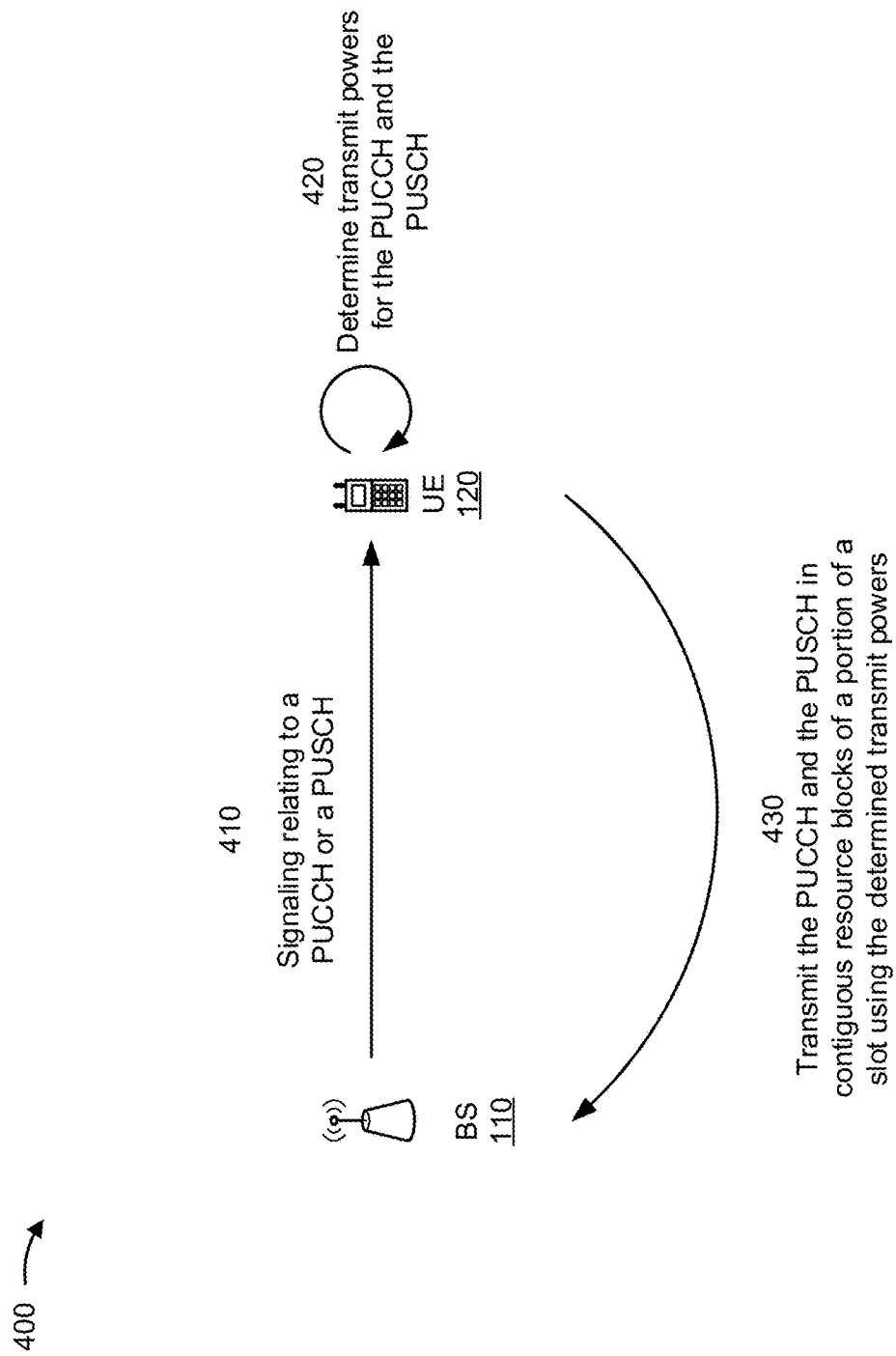
FIG. 4 is a diagram illustrating an example of a UE transmitting a control channel and a data channel in contiguous resource blocks of a portion of a slot based at least in part on determining transmit powers for the control channel and the data channel.

FIG. 4 is a diagram illustrating an example 400 of a UE transmitting a control channel and a data channel in contiguous resource blocks of a portion of a slot based at least in part on determining transmit powers for the control channel and the data channel. As shown in FIG. 4, example 400 may include a BS 110 and a UE 120.

At 410, UE 120 may receive, from BS 110, signaling relating to a control channel or a data channel. For example, UE 120 may receive signaling relating to a PUCCH, a PUSCH, and/or the like. In some aspects, UE 120 may receive semi-static signaling. For example, UE 120 may receive a set of SIB messages identifying a schedule for the control channel or the data channel, such as a schedule indicating that UE 120 is to transmit the control channel and the data channel in a portion of a slot. Additionally, or alternatively, UE 120 may receive dynamic signaling, such as control channel signaling indicating, for example, the maximum delta value representing a maximum difference between a control channel PSD and a data channel PSD when the control channel and the data channel are to be transmitted in contiguous resource blocks of a slot, such as a 6 decibel (dB) difference. In some aspects, UE 120 may obtain the maximum delta value from a data structure, such as based at least in part on UE 120 being configured with a stored maximum delta value.

At 420, UE 120 may determine a control channel transmit power for a control channel and a data channel transmit power for a data channel. For example, UE 120 may determine a PUCCH transmit power for a PUCCH transmission and a PUSCH transmit power for PUSCH transmission that are to be transmitted in contiguous resource blocks of the portion of the slot. In some aspects, UE 120 may determine the control channel transmit power and the data channel transmit power such that the delta value, is less than a maximum delta value, such as less than 6 dB and/or the like.

In some aspects, UE 120 may determine a transmit power for a first one of the control channel or the data channel based at least in part on a transmit power for a second one of the control channel or the data channel. For example, when the control channel is to be associated with a greater PSD than the data channel, UE 120 may determine the data channel transmit power based at least in part on the control channel transmit power. In this case, UE 120 may select the data channel transmit power such that the data channel PSD is within the maximum delta value of the control channel PSD. Similarly, when the data channel is to be associated with a greater PSD than the control channel, UE 120 may select the control channel transmit power such that the control channel PSD is within the maximum delta value of the data channel PSD. In some aspects, UE 120 may select the control channel transmit power and the control channel transmit power concurrently. For example, UE 120 may determine to adjust the control channel transmit power based at least in part on the data channel transmit power and may determine to adjust the data channel transmit power based at least in part on the control channel transmit power. In some aspects, when UE 120 is to determine the transmit power for the first one of the control channel or the data channel based at least in part on the transmit power for the second one of the control channel or the data channel, BS 110 may avoid scheduling multiple UEs 120 for a common group of resource blocks. For example, BS 110 may reserve a set of resource blocks for the PUCCH associated with UE 120, thereby avoiding interrupting code-division multiplexed (CDM) orthogonality.

In some aspects, UE 120 may determine a resource allocation for a first one of the control channel or the data channel based at least in part on a resource allocation for a second one of the control channel or the data channel. For example, to reduce a control channel transmit power when the control channel is associated with a greater transmit power than the data channel, UE 120 may reduce a control channel resource allocation from a candidate resource allocation (i.e., a previous resource allocation or a candidate resource allocation), such as from 2 resource blocks to 1 resource block, from 1 resource block to ½ resource block, and/or the like. In this case, UE 120 may increase a unit power (i.e., the control channel PSD) to ensure that the control channel PSD is within the maximum delta value of a data channel PSD, and, based at least in part on reducing the resource allocation, may maintain a per channel transmit power relative to a candidate transmit power. Similarly, to reduce a data channel transmit power when the data channel is associated with a greater transmit power than the control channel, UE 120 may reduce a data channel resource allocation from a candidate resource allocation, such as from 8 resource blocks to 6 resource blocks, from 1 resource block to ½ resource block, and/or the like. In some aspects, UE 120 may determine the control channel resource allocation and the data channel resource allocation concurrently. For example, UE 120 may increase a quantity of data channel resource blocks from a candidate allocation and may decrease a quantity of control channel resource blocks from a candidate allocation to ensure that the delta value does not exceed the maximum delta value.

In some aspects, UE 120 may determine a power split to cause the control channel transmit power and the data channel transmit power to satisfy a threshold relating to a link budget. For example, UE 120 may determine a control channel transmit power and a data channel transmit power that do not exceed the link budget for UE 120. In some aspects, UE 120 may determine the power split based at least in part on a type of uplink control information (UCI) that is to be transmitted. For example, when the UCI includes an SR or an ACK signal, UE 120 may prioritize allocating transmit power to the control channel by determining the data channel transmit power based at least in part on a candidate control channel transmit power and a maximum transmit power associated with the link budget. In this case, UE 120 may, for example, determine transmit powers such that the control channel PSD is greater than the data channel PSD by the maximum delta value, and such that the link budget is not exceeded.

Additionally, or alternatively, when the UCI includes CQI information, UE 120 may prioritize allocating transmit power to the data channel by determining the control channel transmit power based at least in part on a candidate data channel transmit power and the maximum transmit power. In this case, UE 120 may, for example, determine transmit powers such that the data channel PSD is greater than the control channel PSD by the maximum delta value, and such that the link budget is not exceeded. In some aspects, a candidate transmit power may relate to a threshold transmit power associated with ensuring that an associated signal is conveyed successfully, such as an SR, an ACK signal, or a CQI. In this way, UE 120 reduces a likelihood of failing to successfully convey UCI that is to be transmitted via the control channel or the data channel.

In some aspects, UE 120 may prioritize providing transmit power to the control channel or the data channel based at least in part on another parameter, other than a type of UCI, such as based at least in part on a bias value. For example, UE 120 may be configured to bias PSD toward providing transmit power to the control channel, to the data channel, and/or the like, and may determine the respective transmit powers based at least in part on the bias value. In this way, UE 120 may satisfy one or more other parameters, such as parameters relating to an SNR tolerance of the control channel or the data channel, parameters relating to transmission format (e.g., QPSK, QAM) of the control channel or the data channel, and/or the like.

In some aspects, UE 120 may determine not to transmit one of the control channel or the data channel when determining the respective transmit powers. For example, when UE 120 determines that an SR or an ACK signal is to be transmitted via the control channel, UE 120 may determine, based at least in part on a candidate transmit power for the control channel, an associated PSD, and/or the link budget, that an available transmit power for the data channel does not satisfy a minimum transmit power threshold. In this case, UE 120 may determine not to transmit the data channel, thereby reducing utilization of network resources relative to attempting to transmit the data channel with a data channel transmit power that results in the attempted transmission being unsuccessful. Similarly, when UE 120 determines that CQI information is to be transmitted via the data channel, UE 120 may determine, based at least in part on a candidate transmit power for the data channel, an associated PSD, and/or the link budget, that the available transmit power for the control channel does not satisfy a minimum transmit power threshold. In this case, UE 120 may determine not to transmit the control channel, thereby reducing utilization of network resources relative to attempting to transmit the control channel with a control channel transmit power that results in the attempted transmission being unsuccessful.

In some aspects, UE 120 may determine a resource allocation before determining a transmit power. For example, when UE 120 determines that an SR or ACK signal is to be transmitted via a control channel, UE 120 may increase a quantity of control channel resource allocation from a candidate resource allocation, such as an adjustment from 1 resource block to 2 resource blocks, from 2 resource blocks to 4 resource blocks, and/or the like thereby biasing transmit power toward the control channel. In this case, UE 120 may allocate resources to the data channel based at least in part on the signaling from BS 110. For example, after receiving the signaling UE 120 may allocate resources based at least in part on the resource allocation to the control channel and a maximum resource allocation (i.e., a quantity of available resource blocks). After allocating resources, UE 120 may determine the transmit powers. In this way, UE 120 biases transmit power to a channel to ensure that the channel has a threshold transmit power.

At 430, UE 120 may transmit the control channel and/or the data channel based at least in part on determining the control channel transmit power and the data channel transmit power. For example, UE 120 may transmit a PUCCH and a PUSCH in contiguous resource blocks of the portion of the slot using the determined, respective transmit powers. In some aspects, UE 120 may transmit the control channel and the data channel concurrently. For example, when UE 120 is configured to perform frequency hopping, UE 120 may transmit the control channel and the data channel via a concurrent set of resource blocks.

As indicated above, FIG. 4 is provided as an example. Other examples are possible and may differ from what was described with respect to FIG. 4.

Figure 5:
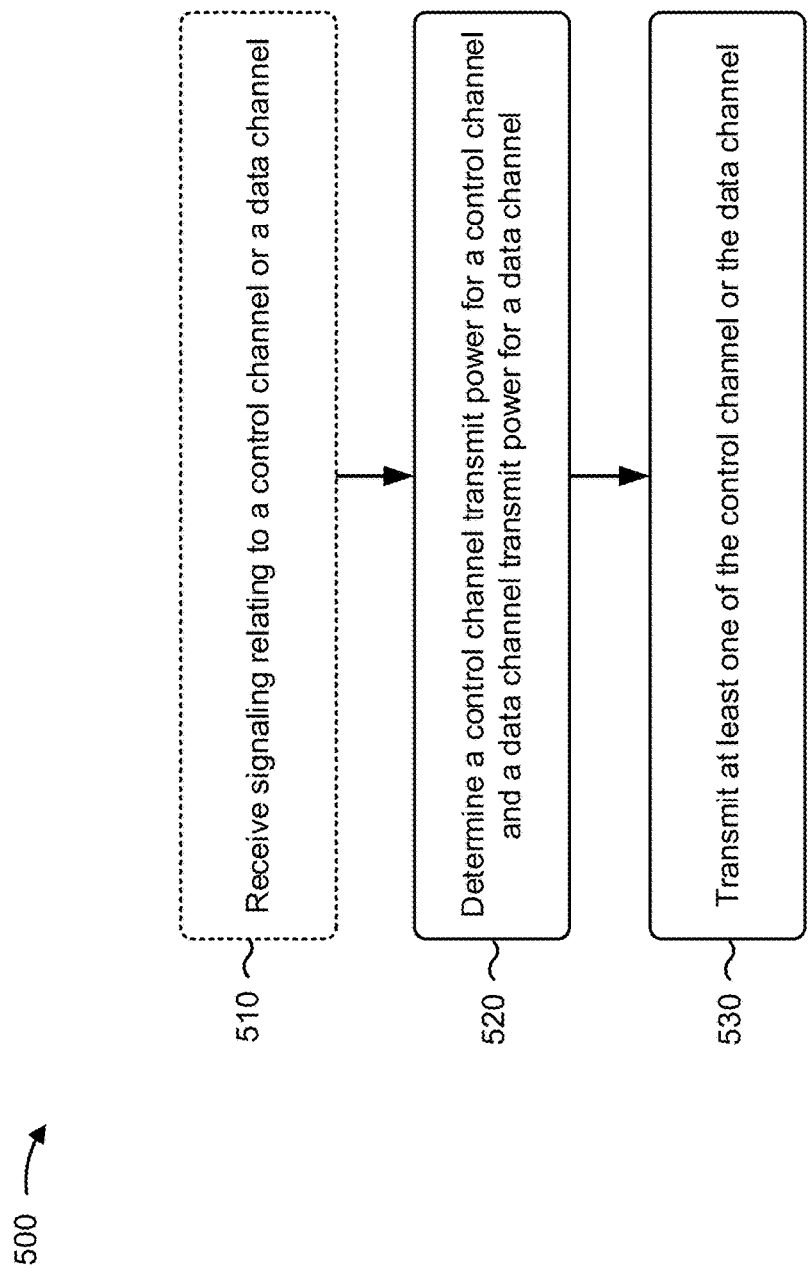
FIG. 5 is a flow chart of a method of wireless communication.

FIG. 5 is a flow chart of a method 500 of wireless communication. The method 500 may be performed by a UE (e.g., which may correspond to one or more of the UE 120, the apparatus 600/600', and/or the like).

At 510, in some aspects, the UE receives signaling relating to a control channel or a data channel (block 510). For example, the UE receives semi-static signaling or dynamic signaling identifying a schedule for the control channel or the data channel, such as a schedule indicating that the UE is to transmit the control channel and the data channel in a portion of a slot. In some aspects, the UE may receive signaling identifying a maximum delta value representing a maximum difference between a control channel PSD and a data channel PSD when the control channel and the data channel are to be transmitted in contiguous resource blocks of a slot.

At 520, the UE determines a control channel transmit power for a control channel and a data channel transmit power for a data channel (block 520). For example, the UE may determine the control channel transmit power and the data channel transmit power based at least in part on information relating to the control channel or the data channel. In some aspects, the difference between a control channel PSD associated with the control channel transmit power and a data channel PSD associated with a data channel transmit power may be less than a threshold (e.g., a threshold delta value, such as a delta value within a threshold amount of the maximum delta value, or the maximum delta value). In some aspects, the control channel transmit power and the data channel transmit power may satisfy a threshold relating to a link budget.

In some aspects, the control channel may be a PUCCH and the data channel may be a PUSCH. In some aspects, the portion of the slot is a region allocated for the control channel or the data channel. In some aspects, a control channel resource allocation and a data channel resource allocation are contiguous resource allocations.

In some aspects, the data channel PSD is greater than the control channel PSD, and the control channel transmit power is determined based at least in part on the data channel transmit power. In some aspects, a control channel resource allocation is determined based at least in part on the control channel transmit power. In some aspects, the control channel PSD is greater than the data channel PSD, and the data channel transmit power is determined based at least in part on the control channel transmit power. In some aspects, a data channel resource allocation is determined based at least in part on the data channel transmit power. In some aspects, a control channel resource allocation and the control channel transmit power are determined based at least in part on a data channel resource allocation and the data channel transmit power, and the data channel resource allocation and the data channel transmit power are determined based at least in part on the control channel resource allocation and the control channel transmit power.

In some aspects, a power split associated with the control channel transmit power and the data channel transmit power is determined based at least in part on a prioritization relating to a type of uplink control information that is to be transmitted during the portion of the slot. In some aspects, the data channel transmit power is determined based at least in part on a candidate control channel transmit power and a maximum transmit power. In some aspects, the control channel transmit power is determined based at least in part on a candidate data channel transmit power and a maximum transmit power.

In some aspects, one of the control channel or the data channel is not transmitted during the portion of the slot based at least in part on a type of uplink control information that is to be transmitted during the portion of the slot, and a transmit power of the other of the control channel or the data channel is determined based at least in part on a candidate transmit power. In some aspects, a control channel resource allocation and a data channel resource allocation are determined before the control channel transmit power and the data channel transmit power are determined. In some aspects, a control channel resource allocation, the control channel transmit power, a data channel resource allocation, and the data channel transmit power are determined based at least in part on received dynamic signaling, received semi-static signaling, or a stored configuration.

At 530, the UE transmits at least one of the control channel or the data channel (block 530). For example, the UE may transmit at least one of the control channel or the data channel during the portion of the slot based at least in part on determining the control channel transmit power and the data channel transmit power. In this case, the UE may transmit at least one of the control channel or the data channel using the determined control channel transmit power and the determined data channel transmit power. In some aspects, based at least in part on determining that the UE is not to transmit a first one of the control channel or the data channel, the UE may transmit a second one of the control channel or the data channel. In some aspects, the UE may transmit the control channel and the data channel. For example, in some aspects, the UE may transmit a PUCCH and a PUSCH in contiguous resource blocks of the portion of the slot. In some aspects, the UE may transmit a PUCCH and a PUSCH in concurrent resource blocks of the portion of the slot (e.g., using frequency diversity).

Although FIG. 5 shows example blocks of a method of wireless communication, in some aspects, the method may include additional blocks, fewer blocks, different blocks, or differently arranged blocks than those shown in FIG. 5. Additionally, or alternatively, two or more blocks shown in FIG. 5 may be performed in parallel.

Figure 6:
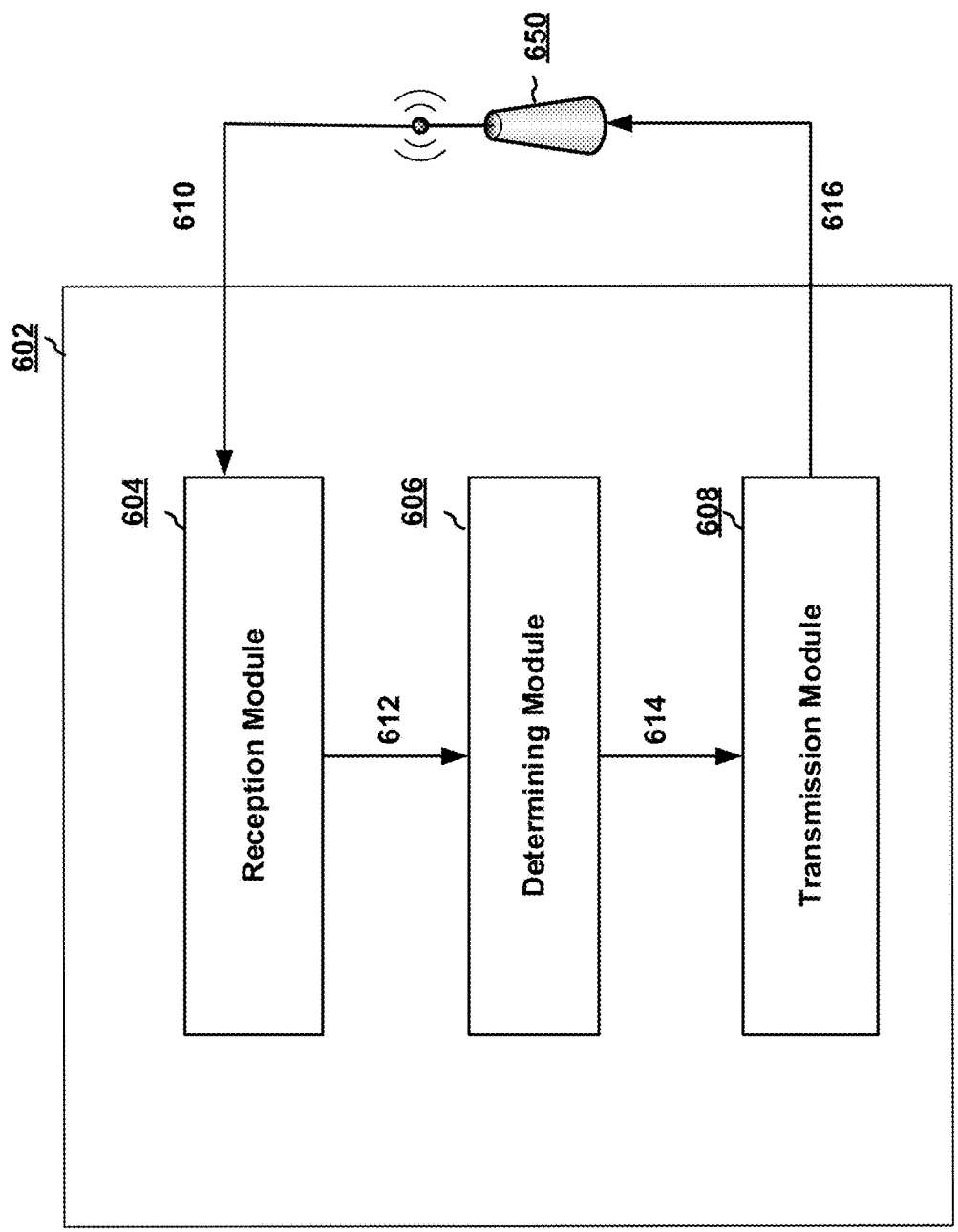
FIG. 6 is a conceptual data flow diagram illustrating the data flow between different modules/means/components in an example apparatus.

FIG. 6 is a conceptual data flow diagram 600 illustrating the data flow between different modules/means/components in an example apparatus 602. The apparatus 602 may be a UE. In some aspects, the apparatus 602 includes a reception module 604, a determining module 606, and/or a transmission module 608.

The reception module 604 may receive, from a base station 650 and as data 610, one or more signaling messages, one or more network measurements, and/or the like. The one or more signaling messages may include one or more SIB messages that may identify a resource allocation for a control channel region, a data channel region, and/or the like. The one or more signaling messages may identify a set of resource blocks allocated for the control channel, a set of resource blocks allocated for the data channel, and/or the like. Additionally, or alternatively, the one or more signaling messages may identify one or more parameters, such as a maximum delta value associated with a maximum difference between a control channel PSD and a data channel PSD. Additionally, or alternatively, the one or more signaling messages may indicate that apparatus 602 is to provide a particular type of UCI, such as an SR, an ACK signal, or a QCI.

The determining module 606 may receive, from the reception module 604 and as data 612, information associated with determining a control channel transmit power for a control channel and a data channel transmit power for a data channel that are to be transmitted during a portion of a slot. For example, based at least in part on receiving information indicating that the apparatus 602 is to provide an ACK signal via a control channel, the determining module 606 may determine the control channel transmit power and the data channel transmit power, such that the control transmit power is prioritized, thereby increasing a likelihood that the ACK signal is successfully transmitted. Similarly, the determining module 606 may determine the control channel transmit power and the data channel transmit power, such that the data channel transmit power is prioritized, thereby increasing a likelihood that QCI information is successfully transmitted via the data channel. In some aspects, the determining module 606 may determine the control channel transmit power and the data channel transmit power based at least in part on a threshold relating to a difference between respective PSDs. For example, the determining module 606 may determine the control channel transmit power and the data channel transmit power such that a difference between a control channel PSD and a data channel PSD is less than a threshold. In some aspects, the determining module 606 may determine the control channel transmit power and the data channel transmit power based at least in part on a link budget. For example, the determining module 606 may determine the control channel transmit power and the data channel transmit power such that a threshold relating to the link budget is satisfied.

The transmission module 608 may receive, from the determining module 606 and as data 614, information indicating a control channel transmit power and a data channel transmit power. In some aspects, the transmission module 608 may receive an indication, from the determining module 606 that one of the control channel or the data channel is not to be transmitted to ensure that a threshold relating to a link budget is satisfied. The transmission module 608 may transmit, to base station 650 and as data 616, at least one of the control channel or the data channel during the portion of the slot.

The apparatus may include additional modules that perform each of the blocks of the algorithm in the aforementioned flow chart of FIG. 5. As such, each block in the aforementioned flow chart of FIG. 5 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 6 are provided as an example. In practice, there may be additional modules, fewer modules, different modules, or differently arranged modules than those shown in FIG. 6. Furthermore, two or more modules shown in FIG. 6 may be implemented within a single module, or a single module shown in FIG. 6 may be implemented as multiple, distributed modules. Additionally, or alternatively, a set of modules (e.g., one or more modules) shown in FIG. 6 may perform one or more functions described as being performed by another set of modules shown in FIG. 6.

Figure 7:
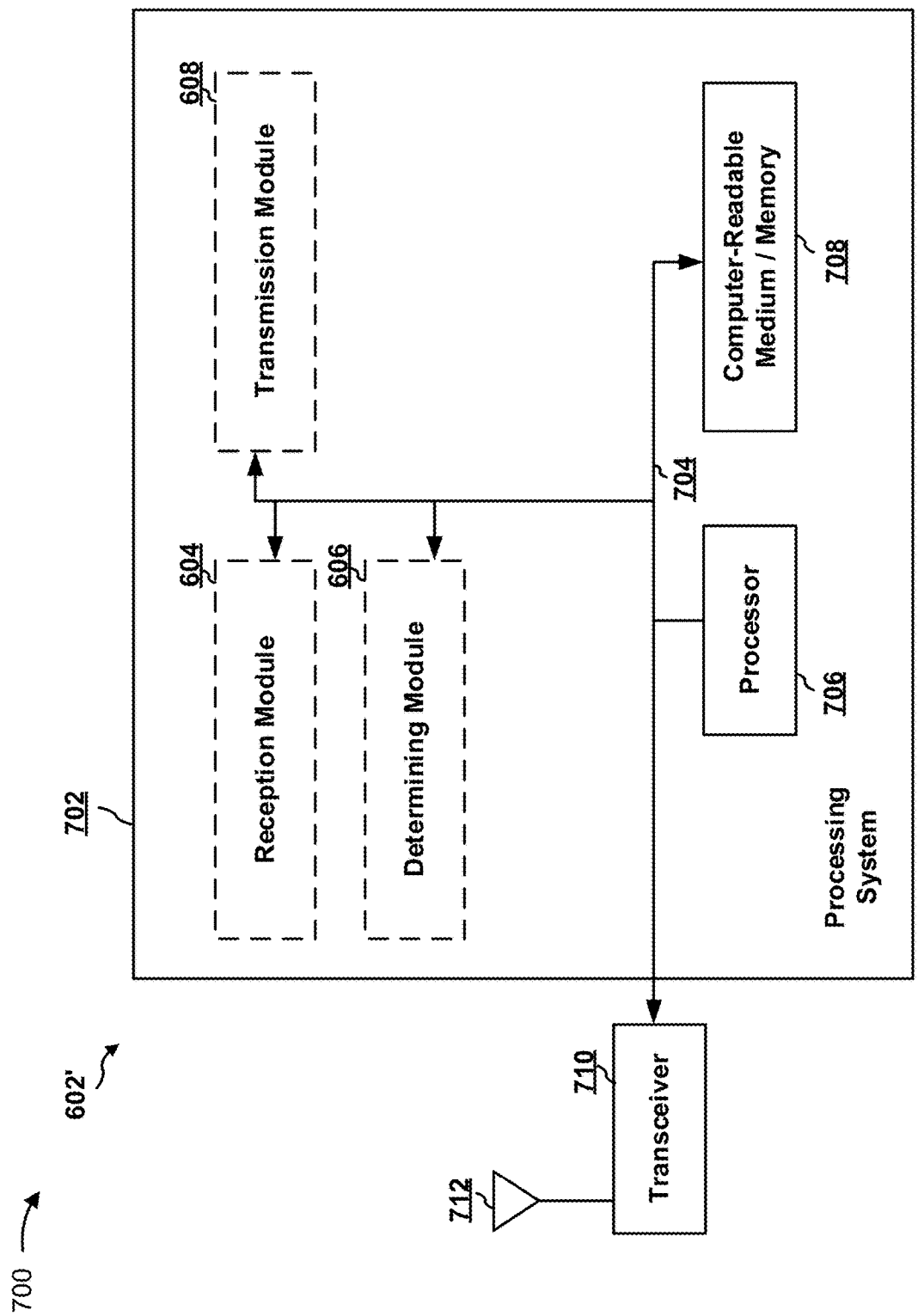
FIG. 7 is a diagram illustrating an example of a hardware implementation for an apparatus employing a processing system.

FIG. 7 is a diagram 700 illustrating an example of a hardware implementation for an apparatus 602' employing a processing system 702. The apparatus 602' may be a UE.

The processing system 702 may be implemented with a bus architecture, represented generally by the bus 704. The bus 704 may include any number of interconnecting buses and bridges depending on the specific application of the processing system 702 and the overall design constraints. The bus 704 links together various circuits including one or more processors and/or hardware modules, represented by the processor 706, the modules 604, 606, 608, and the computer-readable medium/memory 708. The bus 704 may also link various other circuits such as timing sources, peripherals, voltage regulators, and power management circuits, which are well known in the art, and therefore, will not be described any further.

The processing system 702 may be coupled to a transceiver 710. The transceiver 710 is coupled to one or more antennas 712. The transceiver 710 provides a means for communicating with various other apparatus over a transmission medium. The transceiver 710 receives a signal from the one or more antennas 712, extracts information from the received signal, and provides the extracted information to the processing system 702, specifically the reception module 604. In addition, the transceiver 710 receives information from the processing system 702, specifically the transmission module 608, and based at least in part on the received information, generates a signal to be applied to the one or more antennas 712. The processing system 702 includes a processor 706 coupled to a computer-readable medium/memory 708. The processor 706 is responsible for general processing, including the execution of software stored on the computer-readable medium/memory 708. The software, when executed by the processor 706, causes the processing system 702 to perform the various functions described supra for any particular apparatus. The computer-readable medium/memory 708 may also be used for storing data that is manipulated by the processor 706 when executing software. The processing system further includes at least one of the modules 604, 606, and 608. The modules may be software modules running in the processor 706, resident/stored in the computer readable medium/memory 708, one or more hardware modules coupled to the processor 706, or some combination thereof. The processing system 702 may be a component of the UE 120 and may include the memory 282 and/or at least one of the TX MIMO processor 266, the receive processor 258, and/or the controller/processor 280.

In some aspects, the apparatus 602/602' for wireless communication includes means for determining a control channel transmit power for a control channel and a data channel transmit power for a data channel that are to be transmitted during a portion of a slot. A difference between a control channel PSD associated with the control channel transmit power and a data channel PSD associated with the data channel transmit power may be less than a threshold. The control channel transmit power and the data channel transmit power may satisfy a threshold relating to a link budget. In some aspects, the apparatus 602/602' for wireless communication includes means for transmitting at least one of the control channel or the data channel during the portion of the slot. The aforementioned means may be one or more of the aforementioned modules of the apparatus 602 and/or the processing system 702 of the apparatus 602' configured to perform the functions recited by the aforementioned means. As described supra, the processing system 702 may include the TX MIMO processor 266, the receive processor 258, and/or the controller/processor 280. As such, in one configuration, the aforementioned means may be the TX MIMO processor 266, the receive processor 258, and/or the controller/processor 280 configured to perform the functions recited by the aforementioned means.

FIG. 7 is provided as an example. Other examples are possible and may differ from what was described in connection with FIG. 7.

It is understood that the specific order or hierarchy of blocks in the processes/flow charts disclosed is an illustration of example approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for wireless communication, comprising:
   determining, by a user equipment, a control channel transmit power for a control channel and a data channel transmit power for a data channel that are to be transmitted during a portion of a slot,
      wherein the control channel and the data channel are scheduled to be transmitted in contiguous resource blocks of the portion of the slot,
      wherein a difference between a control channel power spectral density (PSD) associated with the control channel transmit power and a data channel PSD associated with the data channel transmit power is less than a maximum difference in PSDs the user equipment can accommodate for contiguous resource blocks,
      wherein the control channel transmit power and the data channel transmit power satisfy a threshold relating to a link budget, and
      wherein a quantity of resource blocks in a resource allocation for the control channel or the data channel is reduced from a quantity of resource blocks in a candidate resource allocation based at least in part on the control channel transmit power or the data channel transmit power; and
   transmitting, by the user equipment, at least one of the control channel or the data channel during the portion of the slot.

2. The method of claim 1, wherein the control channel is a physical uplink control channel (PUCCH) and the data channel is a physical uplink shared channel (PUSCH).

3. The method of claim 1, wherein the portion of the slot is a region allocated for the control channel or the data channel.

4. The method of claim 1, wherein the data channel PSD is greater than the control channel PSD, and wherein the control channel transmit power is determined based at least in part on the data channel transmit power.

5. The method of claim 4, wherein a control channel resource allocation is determined based at least in part on the control channel transmit power.

6. The method of claim 1, wherein the control channel PSD is greater than the data channel PSD, and wherein the data channel transmit power is determined based at least in part on the control channel transmit power.

7. The method of claim 6, wherein a data channel resource allocation is determined based at least in part on the data channel transmit power.

8. The method of claim 1, wherein a control channel resource allocation and the control channel transmit power are determined based at least in part on a data channel resource allocation and the data channel transmit power, and wherein the data channel resource allocation and the data channel transmit power are determined based at least in part on the control channel resource allocation and the control channel transmit power.

9. The method of claim 1, wherein a power split associated with the control channel transmit power and the data channel transmit power is determined based at least in part on a prioritization relating to a type of uplink control information that is to be transmitted during the portion of the slot.

10. The method of claim 1, wherein the data channel transmit power is determined based at least in part on a candidate control channel transmit power and a maximum transmit power.

11. The method of claim 1, wherein the control channel transmit power is determined based at least in part on a candidate data channel transmit power and a maximum transmit power.

12. The method of claim 1, wherein one of the control channel or the data channel is not transmitted during the portion of the slot based at least in part on a type of uplink control information that is to be transmitted during the portion of the slot, and a transmit power of the other of the control channel or the data channel is determined based at least in part on a candidate transmit power.

13. The method of claim 1, wherein a control channel resource allocation and a data channel resource allocation are determined before the control channel transmit power and the data channel transmit power are determined.

14. The method of claim 1, wherein a control channel resource allocation, the control channel transmit power, a data channel resource allocation, and the data channel transmit power are determined based at least in part on at least one of:
received dynamic signaling,
received semi-static signaling, or
a stored configuration.

15. A user equipment for wireless communication, comprising:
memory; and
one or more processors coupled to the memory, the memory and the one or more processors configured to:
determine a control channel transmit power for a control channel and a data channel transmit power for a data channel that are to be transmitted during a portion of a slot,
wherein the control channel and the data channel are scheduled to be transmitted in contiguous resource blocks of the portion of the slot,
wherein a difference between a control channel power spectral density (PSD) associated with the control channel transmit power and a data channel PSD associated with the data channel transmit power is less than a maximum difference in PSDs the user equipment can accommodate for contiguous resource blocks,
wherein the control channel transmit power and the data channel transmit power satisfy a threshold relating to a link budget, and
wherein a quantity of resource blocks in a resource allocation for the control channel or the data channel is reduced from a quantity of resource blocks in a candidate resource allocation based at least in part on the control channel transmit power or the data channel transmit power; and
transmit at least one of the control channel or the data channel during the portion of the slot.

16. The user equipment of claim 15, wherein the control channel is a physical uplink control channel (PUCCH) and the data channel is a physical uplink shared channel (PUSCH).

17. The user equipment of claim 15, wherein the portion of the slot is a region allocated for the control channel or the data channel.

18. The user equipment of claim 15, wherein the data channel PSD is greater than the control channel PSD, and wherein the control channel transmit power is determined based at least in part on the data channel transmit power.

19. The user equipment of claim 18, wherein a control channel resource allocation is determined based at least in part on the control channel transmit power.

20. The user equipment of claim 15, wherein the control channel transmit power is greater than the data channel transmit power, and wherein the data channel transmit power is determined based at least in part on the control channel transmit power.

21. The user equipment of claim 20, wherein a data channel resource allocation is determined based at least in part on the data channel transmit power.

22. The user equipment of claim 15, wherein a control channel resource allocation and the control channel transmit power are determined based at least in part on a data channel resource allocation and the data channel transmit power, and wherein the data channel resource allocation and the data channel transmit power are determined based at least in part on the control channel resource allocation and the control channel transmit power.

23. The user equipment of claim 15, wherein a power split associated with the control channel transmit power and the data channel transmit power is determined based at least in part on a prioritization relating to a type of uplink control information that is to be transmitted during the portion of the slot.

24. The user equipment of claim 15, wherein the data channel transmit power is determined based at least in part on a candidate control channel transmit power and a maximum transmit power.

25. The user equipment of claim 15, wherein the control channel transmit power is determined based at least in part on a candidate data channel transmit power and a maximum transmit power.

26. The user equipment of claim 15, wherein one of the control channel or the data channel is not transmitted during the portion of the slot based at least in part on a type of uplink control information that is to be transmitted during the portion of the slot, and a transmit power of the other of the control channel or the data channel is determined based at least in part on a candidate transmit power.

27. An apparatus for wireless communication, comprising:
means for determining a control channel transmit power for a control channel and a data channel transmit power for a data channel that are to be transmitted during a portion of a slot,
wherein the control channel and the data channel are scheduled to be transmitted in contiguous resource blocks of the portion of the slot,
wherein a difference between a control channel power spectral density (PSD) associated with the control channel transmit power and a data channel PSD associated with the data channel transmit power is less than a maximum difference in PSDs the apparatus can accommodate for contiguous resource blocks,
wherein the control channel transmit power and the data channel transmit power satisfy a threshold relating to a link budget, and
wherein a quantity of resource blocks in a resource allocation for the control channel or the data channel is reduced from a quantity of resource blocks in a candidate resource allocation based at least in part on the control channel transmit power or the data channel transmit power; and
means for transmitting at least one of the control channel or the data channel during the portion of the slot.

28. A non-transitory computer-readable medium storing instructions for wireless communication, the instructions comprising:
one or more instructions that, when executed by one or more processors of user equipment, cause the one or more processors to:
determine a control channel transmit power for a control channel and a data channel transmit power for a data channel that are to be transmitted during a portion of a slot,
wherein the control channel and the data channel are scheduled to be transmitted in contiguous resource blocks of the portion of the slot,
wherein a difference between a control channel power spectral density (PSD) associated with the control channel transmit power and a data channel PSD associated with the data channel transmit power is less than a maximum difference in PSDs the user equipment can accommodate for contiguous resource blocks, wherein the control channel transmit power and the data channel transmit power satisfy a threshold relating to a link budget, and wherein a quantity of resource blocks in a resource allocation for the control channel or the data channel is reduced from a quantity of resource blocks in a candidate resource allocation based at least in part on the control channel transmit power or the data channel transmit power; and transmit at least one of the control channel or the data channel during the portion of the slot.

29. The apparatus of claim 27, wherein the control channel is a physical uplink control channel (PUCCH) and the data channel is a physical uplink shared channel (PUSCH).

30. The non-transitory computer-readable medium of claim 28, wherein the control channel is a physical uplink control channel (PUCCH) and the data channel is a physical uplink shared channel (PUSCH).

\* \* \* \* \*